(12) United States Patent
Yamamoto et al.

(10) Patent No.: US 8,240,745 B2
(45) Date of Patent: Aug. 14, 2012

(54) CONSTRUCTION MACHINE

(75) Inventors: Keiji Yamamoto, Hiroshima (JP);
Kazuaki Kobayashi, Hiroshima (JP);
Yoshiaki Murakami, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 94 days.

(21) Appl. No.: 12/832,413

(22) Filed: Jul. 8, 2010

(65) Prior Publication Data
US 2011/0025097 A1 Feb. 3, 2011

(30) Foreign Application Priority Data

Jul. 29, 2009 (JP) .................. 2009-176176

(51) Int. Cl.
*B62D 33/10* (2006.01)
*B62D 33/06* (2006.01)
(52) U.S. Cl. .......... 296/190.03; 296/187.13; 296/190.01
(58) Field of Classification Search ............... 296/1.03, 296/1.04, 29, 30, 187.01, 187.13, 190.01, 296/190.03, 203.01, 205, 210
See application file for complete search history.

(56) References Cited

U.S. PATENT DOCUMENTS

| | | | |
|---|---|---|---|
| 4,210,362 A | 7/1980 | Boersma | |
| 7,416,244 B2 * | 8/2008 | Polk et al. | 296/190.07 |
| 7,828,371 B2 * | 11/2010 | Murakami | 296/190.03 |
| 2006/0261640 A1 * | 11/2006 | Mori et al. | 296/190.07 |
| 2010/0320802 A1 * | 12/2010 | Miyasaka | 296/190.03 |

FOREIGN PATENT DOCUMENTS

| | | |
|---|---|---|
| JP | 2000-229548 | 8/2000 |
| JP | 2000-233701 | 8/2000 |
| JP | 2004-189089 | 7/2004 |
| JP | 2005-35316 | 2/2005 |
| JP | 3671790 | 4/2005 |

OTHER PUBLICATIONS

U.S. Appl. No. 12/832,331, filed Jul. 8, 2010, Yamamoto, et al.
Extended European Search Report issued on Oct. 15, 2010, in Application No. 10168552.7.

* cited by examiner

*Primary Examiner* — Dennis Pedder
*Assistant Examiner* — Jason S Daniels
(74) *Attorney, Agent, or Firm* — Oblon, Spivak, McClelland, Maier & Neustadt, L.L.P.

(57) ABSTRACT

In a construction machine wherein a cab is mounted on an upper frame of an upper rotating body through an anti-vibration mount, a guard member for protecting the cab in the event of a roll over of the construction machine is mounted so as to extend from a front face portion to a ceiling of the cab, and a lower end of a front portion of the guard member which front portion covers the front face portion of the cab is fixed to a front end portion of the upper frame by a fixing mechanism which permits movement of the cab created in both vertical and horizontal directions by the anti-vibration mount.

5 Claims, 6 Drawing Sheets

CONSTRUCTION MACHINE

BACKGROUND OF THE INVENTION

1. Field of the Invention

The present invention relates to a construction machine having an improved structure for protecting a cab and ensuring an intra-cab operator space in the event of a roll over of the construction machine.

2. Description of the Related Art

In a hydraulic excavator, as shown in FIG. 7, an upper rotating body 2 is mounted on a lower traveling body 1 of a crawler type so as to be rotatable about an axis O which is vertical to the ground, and a cab 4 as an operating room for an operator to get thereon is installed on either the right or the left side (the left side in the following description) of an upper frame 3 of the upper rotating body 2. Further, a working attachment 6 including a boom 5 is mounted to be raised and lowered to the right of the cab 4.

In FIG. 7, the numeral 7 denotes a counter weight provided at a rear end portion of the upper frame 3.

As shown in FIG. 8, the upper frame 3 is provided at a left front portion thereof with a cab mounting section 8, and the cab 4 is mounted on the cab mounting section 8 through anti-vibration mounts 9 for shock absorption which are disposed at four corners of the bottom of the cab.

As disclosed in Japanese Patent Laid-Open Publication No. 2004-189089 (Patent Document 1) and Patent No. 3671790 (Patent Document 2), the anti-vibration mounts 9 each includes an elastic member such as anti-vibration rubber to support the cab 4 elastically and movably in the vertical and horizontal directions with a constant vertical stroke. Therefore, the vibration of the cab 4 is cushioned with the anti-vibration mounts 9.

In connection with the hydraulic excavator, it is prescribed as a cab standard (ROPS) that, in the event of a roll over (tip over) of the construction machine, deformation of the cab 4 should be capable of being suppressed so as to ensure an operator space called DLV (Deflection-Limiting Volume) within the cab.

As a structure for meeting the ROPS standard, there is known a structure (Japanese Patent Laid-Open Publication No. 2005-35316, hereinafter referred to as Patent Document 3) wherein a guard member for reinforcing the cab 4 is mounted at an important portion (e.g., an upper half) of the cab 4 or a structure (Japanese Patent Laid-Open Publication No. 2000-229548, hereinafter referred to as Patent Document 4) wherein a guard member is attached to the upper frame 3 so as to cover the cab.

However, in the structure of Patent Document 3 wherein the guard member is attached to the cab 4 alone, the cab 4 becomes powerless against an external force acting in a direction to strip off the cab from the upper frame 3 in the event of a roll over of the machine, with consequent likelihood of the cab 4 being disengaged from the upper frame 3, although there is obtained a reinforcing effect for the cab 4 itself.

On the other hand, in the structure of Patent Document 4 wherein the guard member is attached to the upper frame, this structure is effective in point of preventing disengagement of the cab 4, but in a construction machine provided with the anti-vibration mounts 9, as shown in FIG. 8, there arises drawback that the shock absorbing function of the mounts 9 is killed by the guard member.

SUMMARY OF THE INVENTION

According to the present invention there is provided a construction machine which permits a guard member to operate effectively against an external force acting in a direction to strip off a cab from an upper frame, while making the most of the shock absorbing function of a anti-vibration mount.

In the construction machine of the present invention, an upper rotating body is mounted on a lower traveling body so as to be rotatable about an axis which is vertical to the ground, and a cab for an operator to get thereon is installed on either the right or the left side of an upper frame as a constituent of the upper rotating body through an anti-vibration mount for shock absorption so as to be movable in vertical and horizontal directions within the range of a shock absorbing stroke of the mount. Further, a guard member for protecting the cab in the event of a roll over of the construction machine is mounted on the cab so as to cover at least a front face portion of the cab. A lower end of a front portion of the guard member which covers the front face portion of the cab is fixed to a front end portion of the upper frame by a fixing mechanism which permits movement of the cab created in both vertical and horizontal directions by the anti-vibration mount.

Thus, according to the present invention, in the construction machine wherein the cab is mounted on the upper frame through the anti-vibration mount, the guard member for protecting the cab in the event of a roll over of the construction machine is attached to the cab, and the lower end of the front portion of the guard member which covers the front face portion of the cab is fixed to the front end portion of the upper frame by the fixing mechanism which permits movement of the cab created in both vertical and horizontal directions by the anti-vibration mount. Therefore, while making the most of the shock absorbing function of the anti-vibration mount, an external force acting in a direction to strip off the cab from the upper frame is received by the fixing mechanism, whereby it is possible to prevent disengagement of the cab.

Since the fixing mechanism is provided between the guard member and the upper frame which are easy to ensure a high strength, the cab disengagement preventing effect is further ensured.

In the above structure, preferably, the guard member has a rear portion extending backwards from an upper end of the front portion and covering the ceiling of the cab, the front and rear portions being attached to the cab.

In this case, since the guard member is mounted on the cab so as to extend from the cab front face portion to the cab ceiling, the cab and the guard member reinforce each other and work together to exhibit a high resisting force against an external force acting in the direction to strip off the cab from the upper frame.

In each of the above structures, preferably, a bracket is projected forwards from the front end portion of the upper frame, and the lower end of the front portion of the guard member is fixed to the bracket by the fixing mechanism.

In this case, since the bracket is projected forwards from the front end portion of the upper frame and the lower end of the front portion of the guard member is fixed to the bracket by the fixing mechanism, such a large-scale remodeling as making the upper frame extend forwards is no longer required and it is possible to easily apply this structure also to an existing construction machine.

In any of the above structures, preferably, the fixing mechanism includes a shaft extending from the upper frame side to the guard member side and movable in the vertical direction together with the guard member and a stopper fixed by the upper frame side and provided on an outer periphery of the shaft so as to limit the amount of movement of the shaft to a magnitude corresponding to the shock absorbing stroke of the anti-vibration mount.

In the above structure, preferably, the shaft includes an internal thread body fixed to the guard member side, a screw shaft screwed into the internal thread body from the upper frame side, and a sleeve fitted on the screw shaft, the sleeve being pressed to be in contact with the internal thread body with a tightening force of the screw shaft to produce an axial force for the prevention of loosening of the screw shaft.

In this case, the fixing mechanism includes the shaft extending from the upper frame side to the guard member side and provided movably in the vertical direction together with the guard member and the stopper fixed by the upper frame side to limit the amount of movement of the shaft to a magnitude corresponding to the shock absorbing stroke of the anti-vibration mount. Therefore, the structure of the fixing mechanism is simplified and easy to install.

In this case, since the internal thread body is fixed to the guard member side and the screw shaft is screwed into the internal thread body from the upper frame side, the installation of the fixing mechanism becomes extremely easy.

Moreover, since the sleeve fitted on the screw shaft is pressed to be in contact with the internal thread body with the tightening force of the screw shaft to produce an axial force for the prevention of loosening of the screw shaft, it is possible to prevent the screw shaft from becoming loose due to vibration or the like and hence possible to keep the clearance constant.

DESCRIPTION OF THE PREFERRED EMBODIMENTS

An embodiment of the present invention will be described below with reference to FIGS. 1 to 6.

Figure 1:
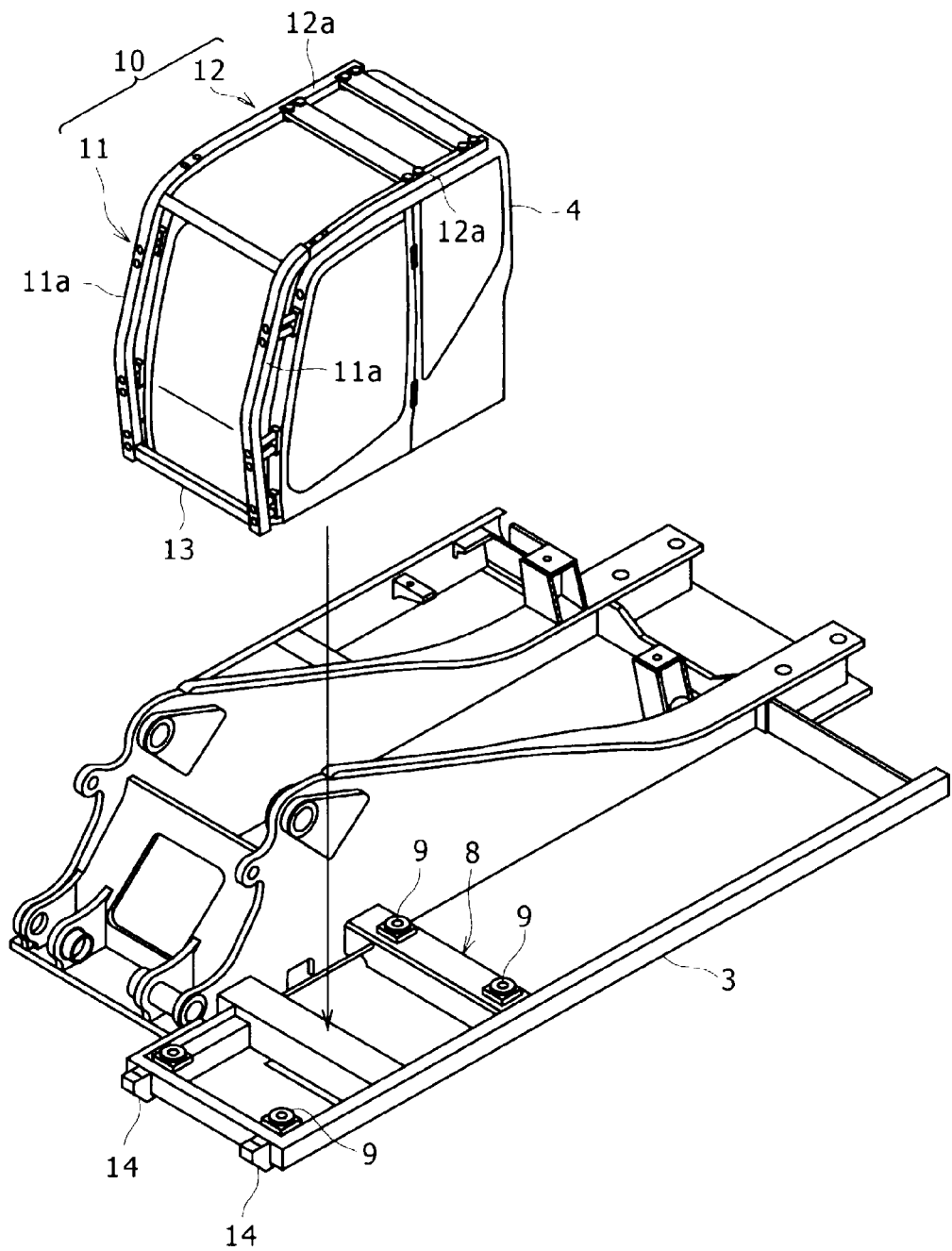
FIG. 1 is an exploded perspective view of an upper frame and a cab according to an embodiment of the present invention.
Figure 2:
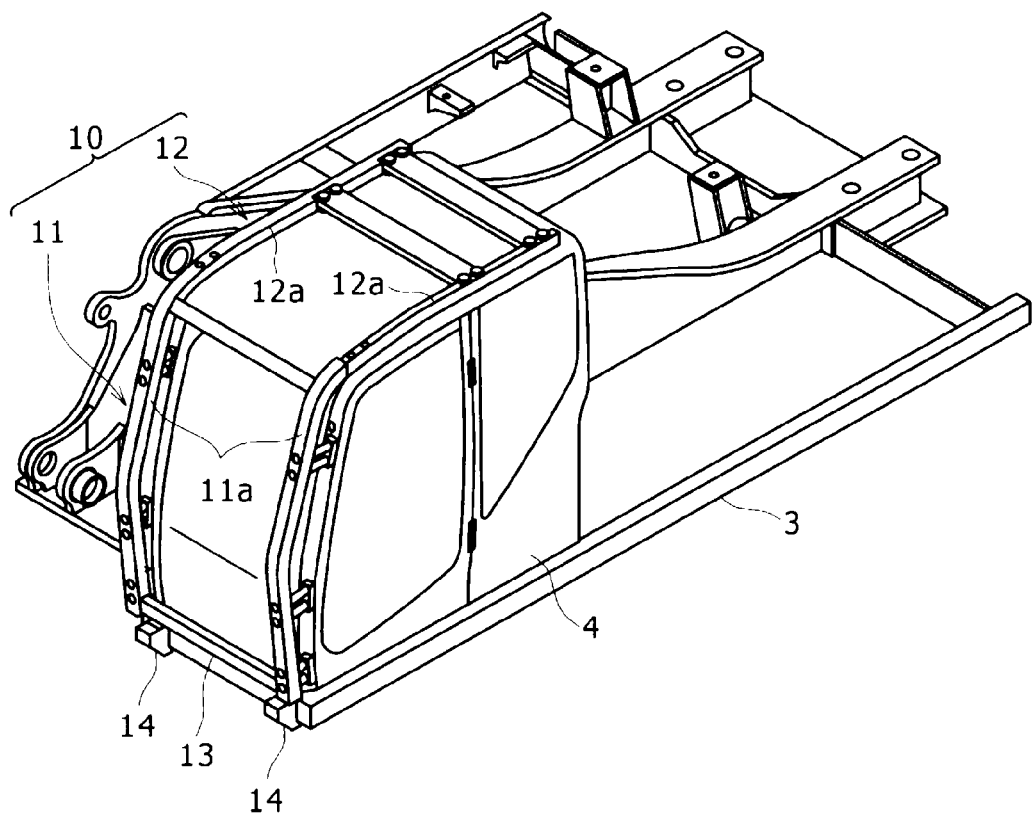
FIG. 2 is a perspective view thereof in an assembled state.
Figure 3:
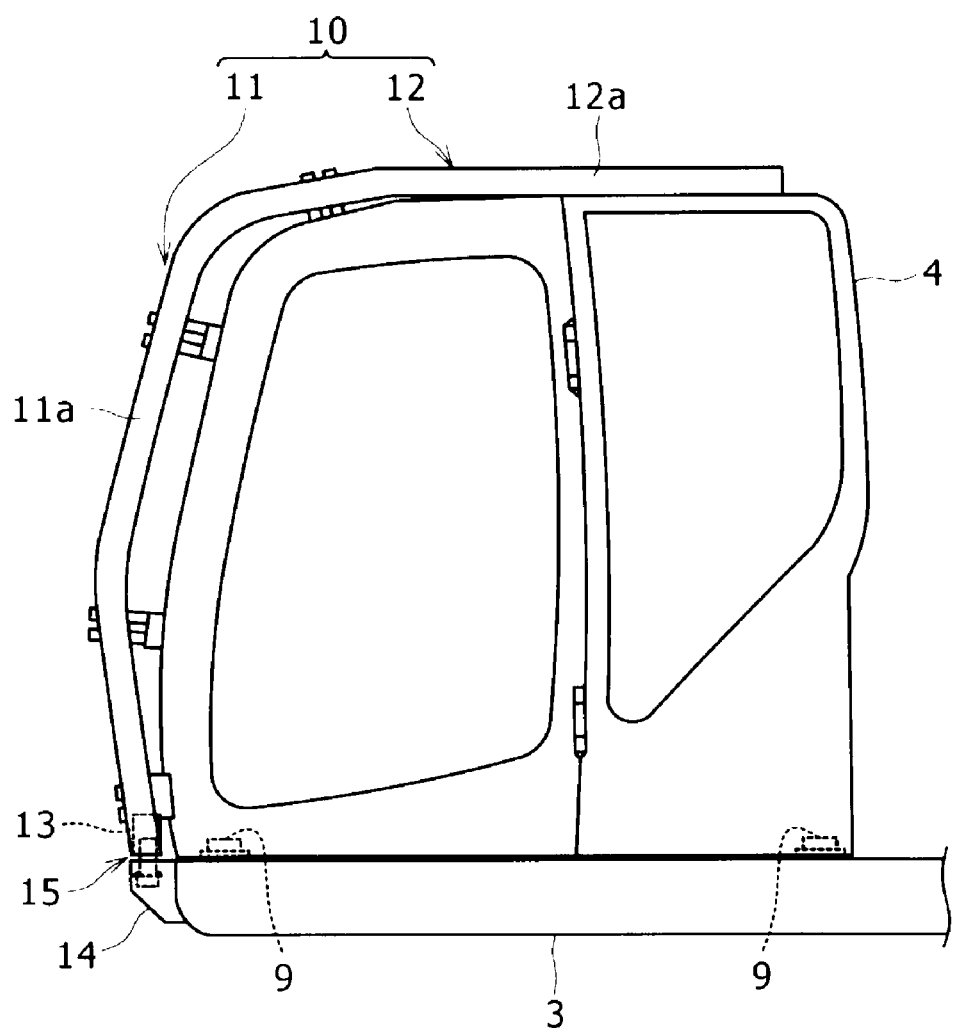
FIG. 3 is a side view thereof.
Figure 4:
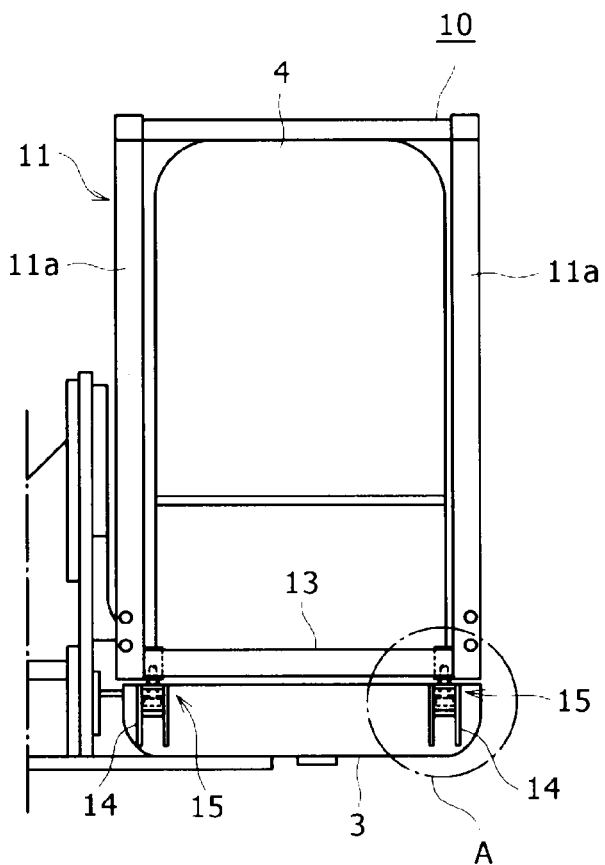
FIG. 4 is a front view thereof.
Figure 5:
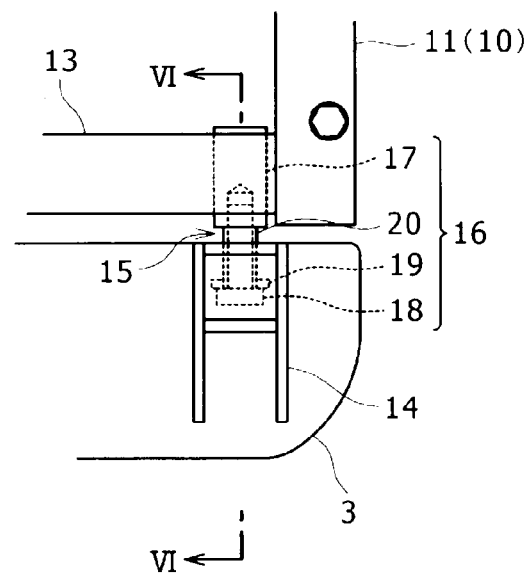
FIG. 5 is an enlarged diagram of a portion A in FIG. 4.
Figure 6:
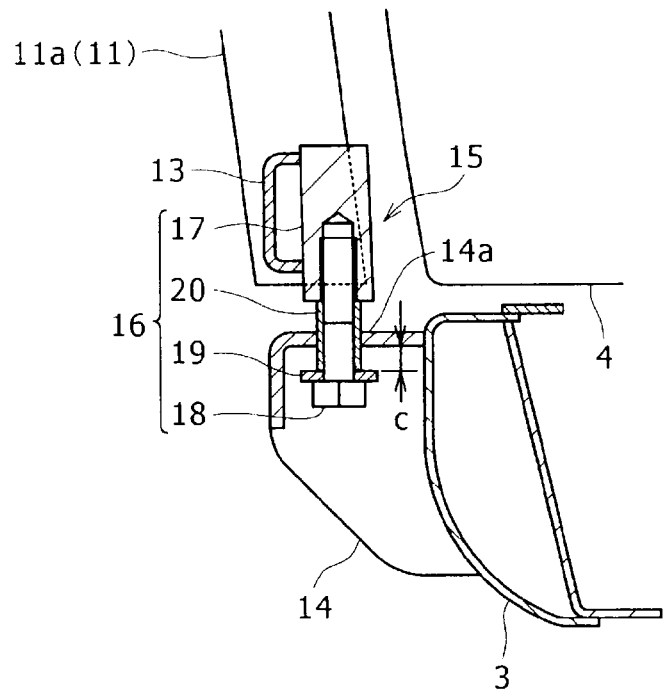
FIG. 6 is a sectional view taken on line VI-VI in FIG. 5.
Figure 7:
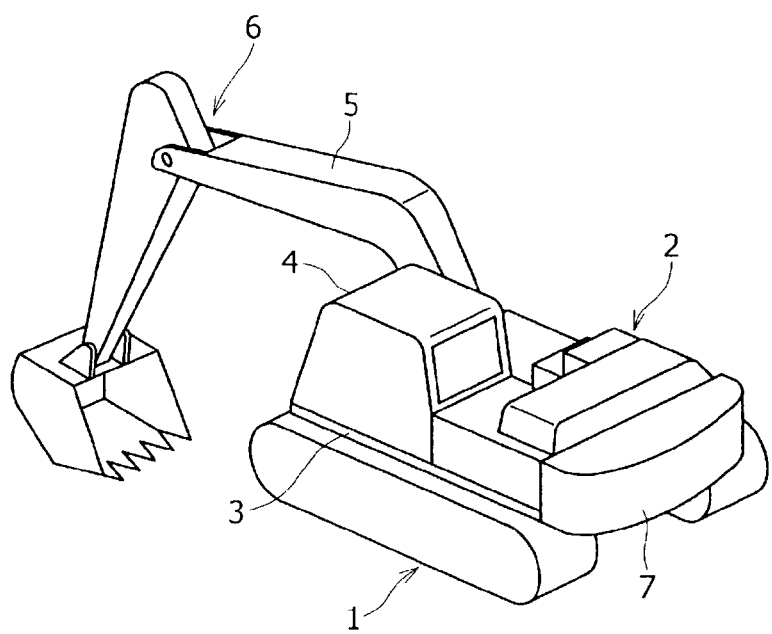
FIG. 7 is a schematic perspective view of a hydraulic excavator as an example of application of the present invention.
Figure 8:
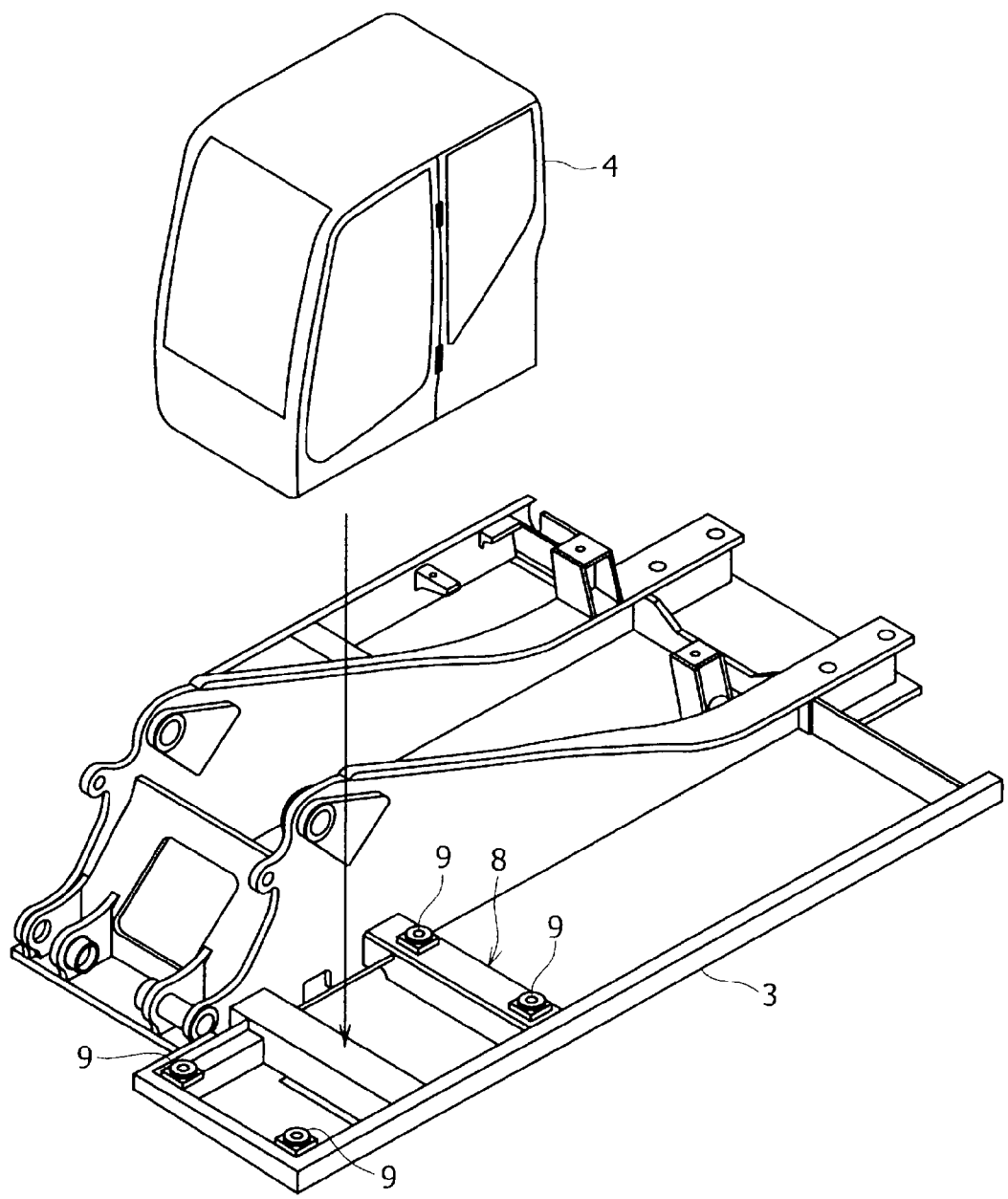
FIG. 8 is an exploded perspective view of an upper frame and a cab in the hydraulic excavator of FIG. 7.

In this embodiment a description will be given assuming that a hydraulic excavator is the construction machine to which the present invention is applied to match the description of the related art. In the following embodiment the same portions as in FIGS. 7 and 8 will be denoted by the same reference numerals as in those figures and repeated explanations thereof will be omitted.

A cab mounting section 8 is provided for a left front portion of an upper frame 3 and a cab 4 is mounted on the cab mounting section 8 while being supported elastically at four corners by anti-vibration mounts 9.

A guard member 10 is attached to the cab 4 to protect the cab in the event of a roll over of the construction machine.

The guard member 10 is made up of a front portion 11 which covers both right and left sides of a front face portion of the cab and a rear portion 12 extending backwards from an upper end of the front portion 11 and covering a cab ceiling, the guard member 10 being formed in a continuous shape (a hook shape from a side view) of both the front portion 11 and rear portion 12. The front and rear portions 11, 12 are bolted to the cab 4 (more particularly a cab frame including front pillars).

The front and rear portions 11, 12 are each formed in a frame shape with plural beams disposed between right and left frames 11a, 11a, 12a, 12a.

A beam 13 is fixed in a suspended state between lower ends of the front portion 11, i.e., lower ends of the right and left frames 11a, 11a. On the other hand, brackets 14, 14 are projected forwards from both right and left sides of a front end portion of the upper frame 3. The brackets 14, 14 and the beam 13 are secured to each other by fixing mechanisms 15, 15 which permit movement of the cab 4 created vertically by the anti-vibration mounts 9.

The fixing mechanisms 15, 15, which are disposed on both right and left sides respectively, are of the same structure. The details of one of the two, as a representative, will be described below with reference to FIGS. 5 and 6.

A through hole 14a (see FIG. 6) is formed in an upper surface of a bracket 14 and a shaft 16 is provided through the through hole 14a so as to extend from the bracket 14 to the beam 13.

The shaft 16 is made up of an internal thread body 17 fixed perpendicularly to the beam 13, a bolt 18 as a screw shaft extending through the through hole 14a from the bracket 14 side, and screwed into the internal thread body 17, a ring-like stopper 19 fitted on the bolt 18, and a cylindrical sleeve 20 which holds down and fixes the stopper 19 onto a bolt head. In a state in which there is formed a clearance, c, for limiting the amount of a vertical movement of the shaft 16 to a magnitude corresponding to a shock absorbing stroke of the anti-vibration mounts 9, between the stopper 19 and the upper surface of the bracket 14, the bolt 18 is screwed into the internal thread body 17 to constitute a fixing mechanism 15.

In this way the front portion 11 of the guard member 10 is connected to the front end portion of the upper frame 3 through the fixing mechanisms 15, 15 and the brackets 14, 14 in a vertically movable state within the range of the clearance, c, (the shock absorbing stroke of the anti-vibration mounts 9).

According to this structure, while making the most of the shock absorbing function of anti-vibration mounts 9, an external force acting in a direction to strip off the cab 4 from the upper frame 3 is received by the fixing mechanisms 15, 15 and hence it is possible to prevent disengagement of the cab 4 from the upper frame 3.

Since each fixing mechanism 15 is disposed between the guard member 10 and upper frame 3 which are easy to ensure a high strength, the disengagement preventing effect for the cab 4 is further ensured.

Besides, since the guard member 10 is mounted on the cab 4 so as to extend from the front face portion and ceiling of the cab, the cab 4 and the guard member 10 reinforce each other and work together to exhibit a high resisting force against the external force acting in the direction of stripping off the cab 4 from the upper frame 3.

Moreover, since the brackets 14, 14 are projected forwards from the front end portion of the upper frame 3 and the lower end portions of the guard member front portion 11 are secured to the brackets 14, 14 by the fixing mechanisms 15, 15, such a large-scale remodeling as making the upper frame 3 extend forwards is no longer required and it is possible to easily apply this structure also to an existing construction machine.

Further, since each fixing mechanism 15 is made up of the shaft 16, the shaft 16 extending from the upper frame side (bracket 14) to the guard member side (beam 13) and being disposed so as to be movable in the vertical direction together with the guard member 10, and the stopper 19 fixed by the upper frame side to limit the amount of movement of the shaft 16 to a magnitude corresponding to the shock absorbing stroke of the anti-vibration mounts 9, the fixing mechanism is simplified in structure and easy to install.

Particularly, in this embodiment, the internal thread body 17 is fixed to the guard member side and the bolt 18 with stopper 19 is screwed into the internal thread body 17 from the bracket 14 side, so that the fixing mechanism 15 becomes extremely easy to install.

Additionally, upon tightening of the bolt 18, the sleeve 20 is pressed to be in contact with the internal thread body 17 to produce an axial force (a downwardly pushing force for the bolt 18). Consequently, loosening of the bolt 18 is prevented and the clearance, c, (the amount of movement of the shaft 16) is kept constant.

The clearance, c, can be selected and adjusted to a desired clearance in a simple manner by changing the length of the sleeve 20.

Other Embodiments (1) The front end portion of the upper frame 3 may be extended forwards and the thus-extended portion and the guard member 10 may be fixed to each other by the fixing mechanisms 15, 15.
(2) The rear portion 12 of the guard member 10 may be extended up to the rear side of the cab 4 and the thus-extended portion may be fixed to the cab 4.

Alternatively, the guard member 10 may be constructed by only the front portion 11 described in the above embodiment.
(3) Although in the above embodiment the fixing mechanisms 15, 15 are each composed of the shaft 16, the screw shaft (bolt) 18, the internal thread body 17, the stopper 19 and the sleeve 20, there may be adopted a structure wherein a shaft provided at its lower end with a head serving as a stopper is disposed so as to extend from the bracket 14 to the beam 13 in a state in which the shaft passes through the through hole 14a of the bracket 14 and in which a clearance is formed between the head and the bracket upper surface as in the above embodiment, and the upper end side of the shaft is fixed to the beam 13 to constitute a shaft with a stopper.
(4) In addition to the application to hydraulic excavators, the present invention is applicable widely to construction machines in which a cab is mounted on an upper frame through an anti-vibration mount, including cannibalizing machines and crushers constructed using a hydraulic excavator as a main body.

Although the invention has been described with reference to the preferred embodiments in the attached figures, it is noted that equivalents may be employed and substitutions made herein without departing from the scope of the invention as recited in the claims.

What is claimed is:
1. A construction machine comprising:
a lower traveling body;
an upper rotating body mounted on said lower traveling body so as to be rotatable about an axis which is vertical to the ground;
an anti-vibrational mount for shock absorption;
a cab for an operator, said cab being provided on either a right or a left side of an upper frame, as a constituent of said upper rotating body, through said anti-vibration mount for shock absorption, so as to be movable in both vertical and horizontal directions within the range of a shock absorbing stroke of said anti-vibration mount;
a guard member mounted on said cab, said guard member having at least a front portion so as to cover at least a front face portion of said cab to protect said cab in the event of a roll over of the construction machine;
a bracket provided at a front end portion of said upper frame such that said bracket projects forward from the front end portion of said upper frame; and
a fixing mechanism for fixing a lower end of the front portion of said guard member to said bracket projecting from the front end portion of said upper frame, said fixing mechanism permitting movement of said cab created in both vertical and horizontal directions by said anti-vibration mount.
2. The construction machine according to claim 1, wherein said guard member has a rear portion extending rearwards from an upper end of said front portion and covering a ceiling of said cab, both said front and rear portions of said guard member being mounted on said cab.
3. The construction machine according to claim 1, wherein said fixing mechanism comprises a shaft extending from the upper frame side to the guard member side and movable in the vertical direction together with said guard member, and a stopper provided to said upper frame side and provided on an outer periphery of said shaft so as to limit the amount of movement of said shaft to a magnitude corresponding to the shock absorbing stroke of said anti-vibration mount.
4. The construction machine according to claim 3, wherein said shaft comprises an internal thread body fixed to said guard member side, a screw shaft screwed into said internal thread body from said upper frame side, and a sleeve fitted on said screw shaft, said sleeve being pressed to be in contact with said internal thread body with a tightening force of said screw shaft to produce an axial force for the prevention of loosening of said screw shaft.
5. The construction machine according to claim 1, wherein said fixing mechanism comprises a shaft extending from the upper frame side to the guard member side and movable in the vertical direction together with said guard member, said shaft including:
an internal thread body;
a screw shaft screwed into said internal thread body from said upper frame side,
a stopper fitted on the screw shaft,
a sleeve press-fitted on the screw shaft between said stopper and the internal thread body with a tightening force of said screw shaft to produce an axial force for the prevention of loosening of said screw shaft from the internal thread body, wherein the stopper is
fixed by said upper frame side and provided on an outer periphery of said shaft so as to limit the amount of movement of said shaft to a magnitude corresponding to the shock absorbing stroke of said anti-vibration mount.

* * * * *